US007691316B2

(12) United States Patent
Ngo et al.

(10) Patent No.: US 7,691,316 B2
(45) Date of Patent: Apr. 6, 2010

(54) DEVICES AND METHODS FOR THE SYNTHESIS OF NUCLEIC ACIDS

(75) Inventors: Nam Ngo, Campbell, CA (US); Laurent Jaquinod, Davis, CA (US); Hong Wang, San Diego, CA (US)

(73) Assignee: Chemistry & Technology For Genes, Inc., San Jose, CA (US)

( * ) Notice: Subject to any disclaimer, the term of this patent is extended or adjusted under 35 U.S.C. 154(b) by 1770 days.

(21) Appl. No.: 10/776,694

(22) Filed: Feb. 12, 2004

(65) Prior Publication Data

US 2008/0084008 A1 Apr. 10, 2008

(51) Int. Cl.
*B29C 39/36* (2006.01)
*B29C 67/04* (2006.01)

(52) U.S. Cl. ....................... 264/345; 264/109; 264/125; 264/271.1; 264/279.1; 264/328.6; 264/340

(58) Field of Classification Search ................ 264/109, 264/118, 127, 239, 279.1, 271.1, 320, 322, 264/328, 331.15, 120, 122, 125, 279, 328.6, 264/328.14, 340, 345, 347
See application file for complete search history.

(56) References Cited

U.S. PATENT DOCUMENTS

| | | | | |
|---|---|---|---|---|
| 2,400,482 | A * | 5/1946 | Brannon et al. | 249/119 |
| 4,153,661 | A | 5/1979 | Ree et al. | |
| 4,373,519 | A | 2/1983 | Errede et al. | |
| 4,415,732 | A | 11/1983 | Caruthers et al. | |
| 4,458,066 | A | 7/1984 | Caruthers et al. | |
| 4,565,663 | A | 1/1986 | Errede et al. | |
| 4,725,677 | A | 2/1988 | Koster et al. | |
| 4,971,736 | A | 11/1990 | Hagen et al. | |
| 5,550,033 | A * | 8/1996 | Krumdieck | 435/40.52 |
| 5,904,848 | A | 5/1999 | Wong et al. | |
| 6,261,497 | B1 * | 7/2001 | Wong et al. | 264/120 |
| 6,309,828 | B1 * | 10/2001 | Schleifer et al. | 435/6 |
| 6,416,716 | B1 | 7/2002 | Shukla et al. | |
| 6,558,628 | B1 * | 5/2003 | Reo | 422/99 |
| 6,590,092 | B1 | 7/2003 | Ngo | |
| 6,630,221 | B1 * | 10/2003 | Wong | 428/117 |
| 6,756,005 | B2 * | 6/2004 | Panek et al. | 264/255 |
| 2004/0029258 | A1 * | 2/2004 | Heaney et al. | 435/287.2 |
| 2004/0071595 | A1 * | 4/2004 | Neeper et al. | 422/72 |
| 2005/0048667 | A1 * | 3/2005 | Ellman et al. | 436/174 |
| 2005/0212869 | A1 * | 9/2005 | Ellson et al. | 347/75 |

FOREIGN PATENT DOCUMENTS

| | | | |
|---|---|---|---|
| GB | WO 00/21658 A2 | | 4/2000 |
| JP | 05245848 A | * | 9/1993 |
| WO | WO 0069878 | * | 11/2000 |

* cited by examiner

*Primary Examiner*—Philip C Tucker
*Assistant Examiner*—Dimple N Bodawala
(74) *Attorney, Agent, or Firm*—Schneck & Schneck; Thomas Schneck

(57) ABSTRACT

Cylindrical devices (frits) are prepared by embedding aminoalkyl- or mercaptoalkyl-modified Controlled Pore Glass (CPG) in high-density polyethylene. Methods and devices pertaining to their use in the synthesis of nucleic acids are described. A reusable synthesis column or a reusable 96-chamber synthesis plate have been designed to hold one to 96 of the said frits that are inserted reproducibly into the synthesis chambers with a frit insertor. A short gas surpressure is required to drive entry of chemical reagents into the said frit. Reagents are retained into the frit until a second, longer surpressure is applied to drain the said reagents.

8 Claims, 9 Drawing Sheets

TMS = trimethylsilyl; CDI = carbonyldiimidazole

DEVICES AND METHODS FOR THE SYNTHESIS OF NUCLEIC ACIDS

BACKGROUND OF THE INVENTION

Composite structures made of thermoplastic resins and particulate materials have been widely described. U.S. Pat. No. 4,153,661 describes a method for making composite sheets comprising particulate distributed in a matrix of polytetrafluoroethylene (PTFE) fibrils. U.S. Pat. Nos. 4,373,519 and 4,565,663 disclose methods for making water-swellable composite sheets having hydrophilic absorptive particles enmeshed in a PTFE matrix. U.S. Pat. No. 4,971,736 describes methods of enmeshing non-swellable particulate in a PTFE matrix and their use as chromatographic articles.

U.S. Pat. No. 5,904,848 describes methods for calendering and sintering an aqueous dispersion of PTFE and controlled pore glass (CPG) into rigid porous sheets of 5 to 200 mils in thickness from which disc membranes are being cut. The membrane porosity is adjusted by using CPG of various pore sizes. Post-silanization treatment of the said disc membranes is required to introduce reactive moieties onto the CPG surface.

U.S. Pat. No. 6,416,716 disclosed methods to prepare tubes which interior surfaces are embedding separation medium particles. For instance a polypropylene tube filled with C-18 particles was heated to embed the separation medium particles into the interior of the tubes due to the melting of the polypropylene. Other embedded devices described in World patent No 00/21658 are prepared by sintering functionalized polystyrenes with polyalkylenes especially polyethylene and polypropylene. The said devices contain at least 10 μmol of reactive functionalities available for synthetic purposes notably peptide syntheses. The porosity of those devices to methanol at ambient temperature and pressure is described as being at least of 0.2 mL/min.

Although the general concepts of embedded devices have been discussed, cylindrical devices prepared by embedding modified-CPG in polyalkylene and the methods pertaining to their utilization in the synthesis of nucleic acids have not been developed thus far.

BRIEF SUMMARY OF THE INVENTION

The present invention described the preparation of cylindrical devices called frits, made from polyalkylene embedded modified-CPG. The said frits are prepared by embedding modified-CPG such as aminoalkyl-CPG or mercaptoalkyl-CPG into a polyalkylene network, providing a generally uniform dispersion of the inorganic material into the resin. To be used with current nucleic acid synthesizers, the said frit must contain less than 10 μmol of reactive amino or mercapto moieties, preferably less than 2 μmol and especially less than 1 μmol. Entry and draining of chemical reagents into and from the frits of the invention are brought about by applying a differential pressure such as a vacuum or preferably a gas surpressure on an automated synthesizeur. Thus at ambient pressure, the porosity of those devices is such that the gravity-induced entry of the said chemical reagents is prevented. This allows for an efficient pre-mixing of reagents prior to their entry into the frit. Reagents are pushed into the frits by applying a short gas surpressure and are retained into the frits for the desired amount of time without dripping. This particular feature minimizes the volume of reagents required for the synthesis to the void volume of the cylindrical frit, therefore optimizing the consummation of the said reagents and their reactivity profile.

It is a further object of this invention to provide accessories facilitating the use and the post synthesis manipulations of the said synthesis frits. To this purpose, synthesis plates have been drilled with open top and bottom synthesis chambers to hold up to 96 fritz. For low throughput synthesis, single synthesis column with open top and bottom ends have been prepared. A frit insertor is used to insert frits into the synthesis columns or the plate chambers from their top ends. Upon completion of a synthesis, a frit extractor is used to push the frits through the bottom ends of the said chambers or said columns without damaging frits, columns or chambers. This allows synthesis plates and synthesis columns to be reused.

It is still a further object of this invention to provide a reliable method enabling the automated synthesis of nucleic acids by using frits that have been derivatized with a catechol-based universal linker. By definition, a universal linker allows the synthesis of nucleic acids on a solid support regardless of the nature of their 3'-terminal base by reacting with the 3'-end of a nucleoside, functionalized in particular with a phosphoramidite moiety. The oligonucleotide-bound solid support, upon treatment under the usual conditions of deprotection, is recovered as a 3'-hydroxyoligonucleotide.

The term oligonucleotides and nucleic acids refer to ribonucleic acids or deoxyribonucleic acids in which modifications can take place at the level of the base, the ribose rings or the internucleotide phosphate bonds in a chemically known manner.

DETAILED DESCRIPTION OF THE INVENTION

A. Frit Preparation

Figure 1:
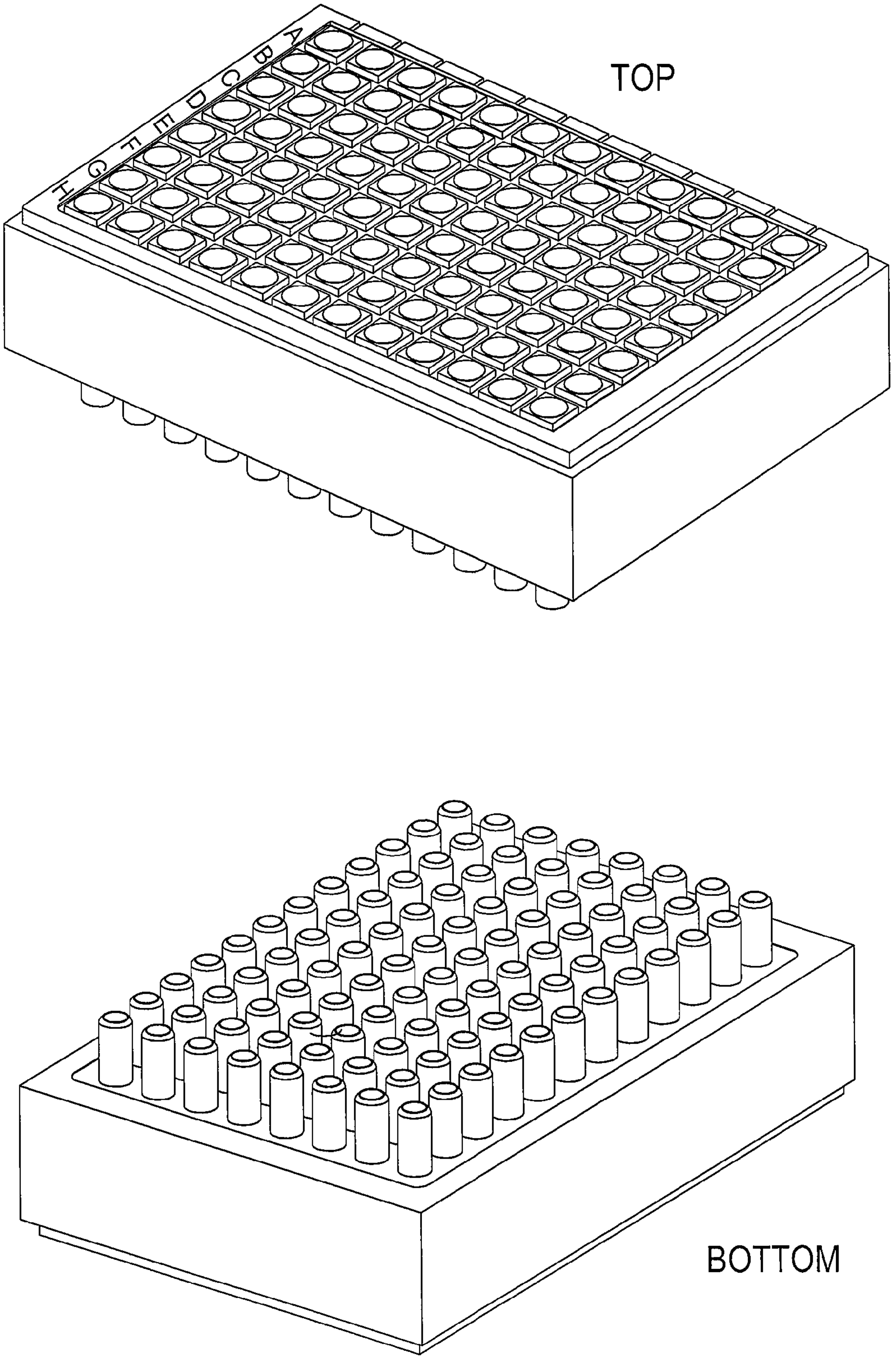
FIG. 1 shows a top and a bottom view of a 96-chamber synthesis plate.

To produce the frits of the invention, silane-modified CPG is advantageously used in order to control the said frit loading capacity prior to its manufacture. Bifunctional silanes, having a first functional group enabling covalent binding to the glass surface (a Si-halogen or Si-alkoxy group) and a second functional group that imparts the desired chemical modifications to the surface, are used to modify the CPG surface. Silane-modified CPG are controlled porous glass beads, which have been preferentially modified with aminoalkyltrialkoxysilane, [alkylamino]alkyl(trialkoxy)silane or mercaptoalkyl-(trialkoxy)silane and mixtures thereof. Preferentially, alkyl is selected from the group consisting of methyl, ethyl and propyl and wherein alkoxy is selected from the group consisting of methoxy, ethoxy and propoxy. In a preferred embodiment, low loading capacity (5 to 30 μmol/g) aminopropyl-CPG 1 is prepared by reacting CPG (500, 1000 or 2000 A pore diameter, preferably 1000 A, particle size 40/75 or 75/200 microns, preferably 75/200) with aminopropyltriethoxysilane in dichloromethane at room temperature.

A silane-modified CPG or a blend of two different silane-modified CPG is mixed with an aqueous-free polyalkylene in a solid weight ratio of 30 to 50%. Polyalkylenes are selected from the group consisting of ultrahigh molecular weight polyethylene, high density polyethylene, medium density polyethylene, low density polyethylene, polypropylene, and mixtures thereof. Preferentially, aminoalkyl-CPG 1 is mixed in a solid weight ratio of 35 to 45% with high-density polyethylene.

An aluminum plate drilled with 50 to 5000 wells, preferably 1000 to 2000, is filled with the said polyethylene/silane-modified CPG mixture. In one embodiment, the aluminum plate dimensions (X, Y, Z in inch) are respectively (14.0, 6.0, 0.50). Preferably, the said wells have a round cross sectional shape. In one embodiment, cylindrical wells with a diameter/length (in mm) of 3.90/6.0 or 3.90/9.0 or 3.90/12.0 have been drilled. Those wells yield cylindrical frits which sizes are optimal to contain 50 nmol, 200 nmol and 1 μmol of reactive moieties, respectively.

The said filled aluminum plate is heated at approximately 180 to 200° C. under a normal atmosphere for a predetermined time (5 to 20 min). Heating schedule is a function of the mixture composition, the size of the aluminum plate and the number of chambers. At these temperature, around 1 to 5% shrinkage uniformly occurs throughout the structure. For use with this invention, preferably the firing schedule, temperature and powder composition can be modified in such a way as to significantly control shrinkage. Upon cooling the aluminum plate, the frits are removed from the wells and are controlled for adequate mass and diameter.

B. Accessories

It is a further object of this invention to provide accessories enabling convenient and reproducible uses of the synthesis frits.

Synthesis plates have been prepared and used as frit holders to carry out the high throughput synthesis of nucleic acids. The said plate is preferably made of Teflon. Preferably, the plate surface is modeled off the industry standard. This way, equipment such as multiple pipetters or robots designed for use with 96-well plates may be easily adjusted for use with the said synthesis plate. The synthesis plate may be of any height (Z), preferably between 1.5 and 2.0 inches. In one preferred embodiment, the plate dimensions (X, Y, Z) in inch are 4.98, 3.35, 1.60, respectively.

Any number of cylindrical open top and bottom ends chambers may be drilled into a synthesis plate. Preferably, the number of chambers is a multiple of 48 (i.e., 96, 384, 1536), especially 96 (see FIG. 1). Preferably, the spacing between chambers, both in the X and Y direction of the plate, is modeled off the industry standard 96-well plate (8×12 mutually perpendicular rows).

Figure 2:
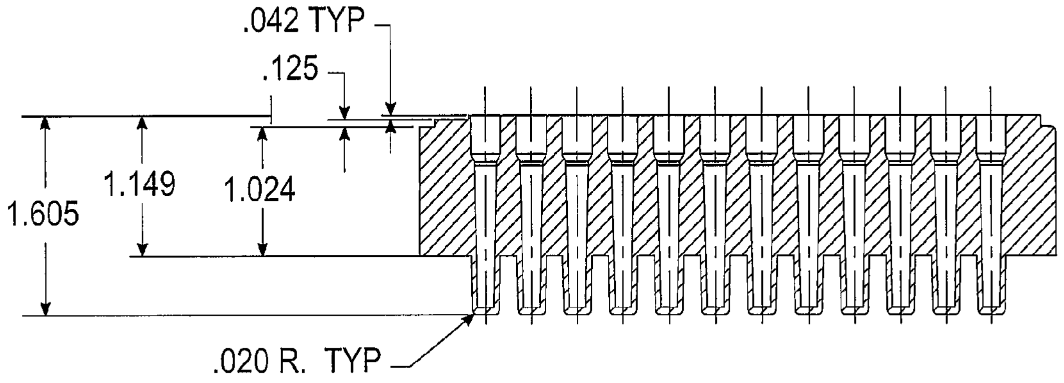
FIG. 2 is a bottom view of a 96-chamber synthesis plate.
Figure 3:
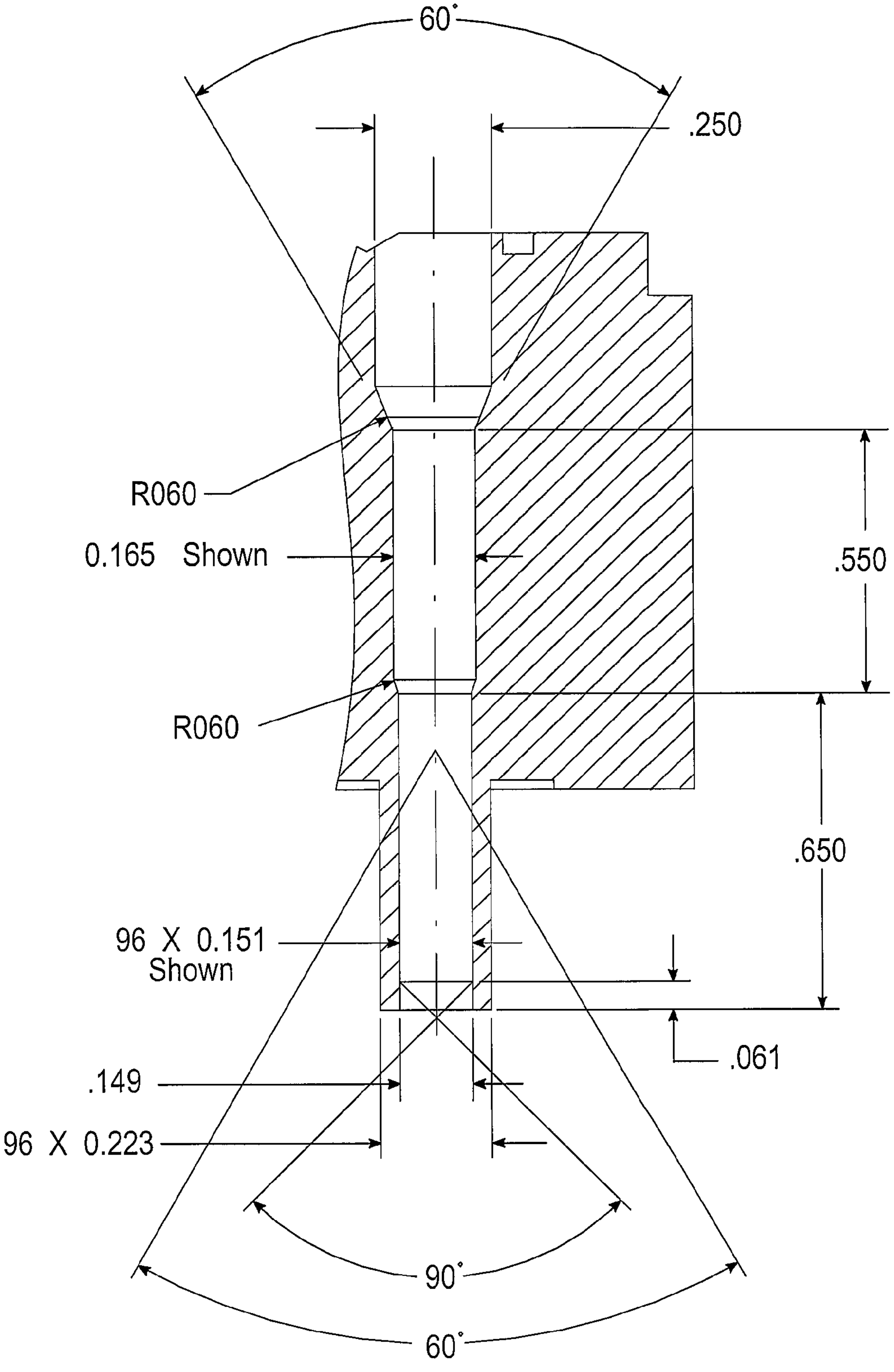
FIG. 3 is an enlarged, cross sectional view of a single chamber.

FIGS. 2 and 3 show a cross-sectional view of a 96-chamber plate and an enlarged cross-sectional view of a single chamber, respectively. A chamber is made of a top cylinder, a middle cylinder and a bottom cone. The sidewalls of the top and middle cylinders may be of any height, depending on the desired volume of reagents per chamber. Preferably, the height of each cylinder is between 0.40 and 0.80 inch. The top and middle cylinder cross diameters are wider than the cross diameter of a cylindrical frit. Preferably, the top cylinder is wider by 0.10 to 0.15 inch and the middle cylinder is wider by 0.01 to 0.05 inch. The bottom cone or frit holder has a cross diameter smaller than the cross diameter of a cylindrical frit. Preferably, the cone has a top cross diameter 0.001 to 0.003 inch smaller than the cross diameter of a cylindrical frit, preferably 0.002 to 0.003 and a bottom cross diameter 0.003 to 0.008 inch smaller than the cross diameter of a cylindrical frit, preferably 0.004 to 0.005 inch. A smaller diameter cone allows the frit to be held tightly which has a three-fold effect: (i) it prevents the frits from being extracted from the synthesis plate during the automated synthesis of nucleic acids when a gas (nitrogen, argon) surpressure is applied to drive the chemical reagents into the frits or to drain the reagents from the frits. (ii) It prevents dripping and draining of the reagents of the reagents along the chamber sidewalls. Thus, it ensures that the reagents are forced into the frits or are fully drained when a gas surpressure is applied. (iii) It maintains a homogenous backpressure from each frit-filled chamber regardless of its synthesis status (i.e. synthesis completed or not in the said chamber).

Figure 4:
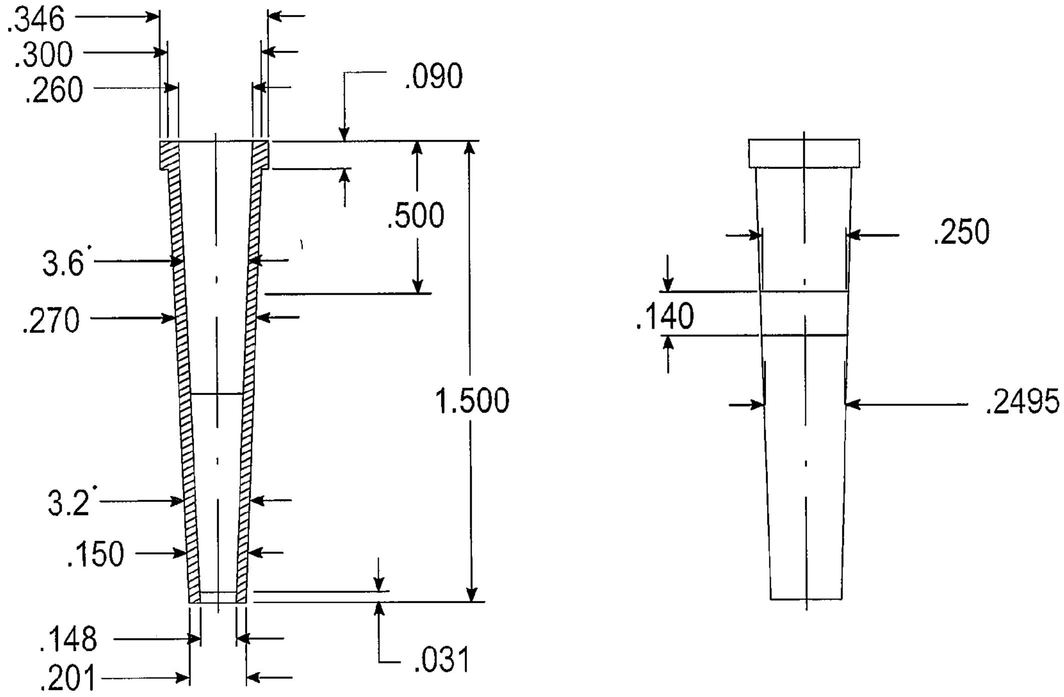
FIG. 4 is a cross sectional view of a synthesis column.

For low throughput nucleic acid synthesis single synthesis columns prepared by injection molding of polypropylene are used. The said columns are opened cone with open top and bottom ends (FIG. 4). They are used to hold a single frit in a low throughput synthesis of nucleic acids. Notably, the said column has a holding cylinder 0.002 to 0.010 inch smaller than the cross diameter of a cylindrical frit, preferably 0.002 to 0.004 inch.

Figure 5:
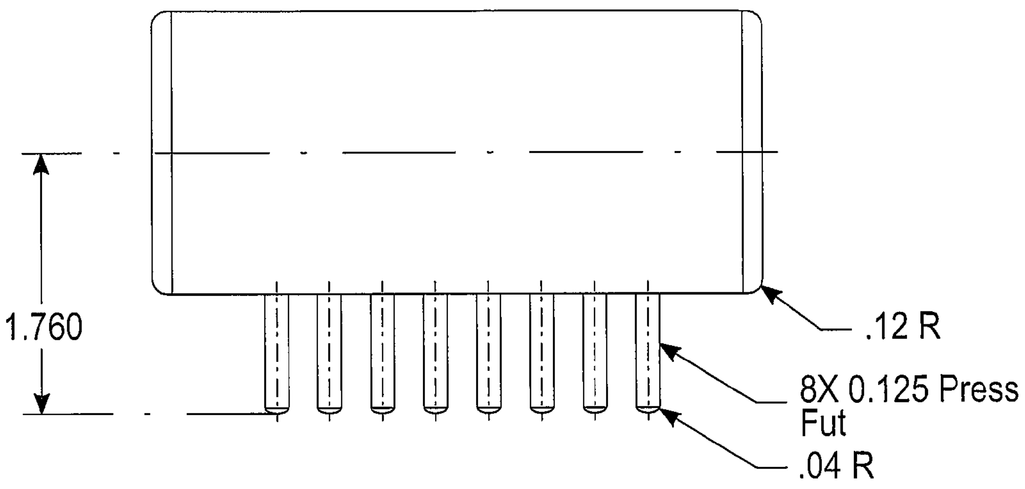
FIG. 5 is a schematic view of an 8-pin insertor.

A one- to 96-steel pin insertor is used to insert from one to 96 frits into the synthesis chambers from their top ends and secured them reproducibly into the bottom cone of the chambers. Preferably, an 8-pin insertor is used to insert simultaneously eight frits into eight synthesis chambers. A detailed schematic view of an 8-pin insertor is shown FIG. 5. The steel pin insertor length is slightly longer than the combined length of the top and middle cylinders of a synthesis chamber.

Figure 6:
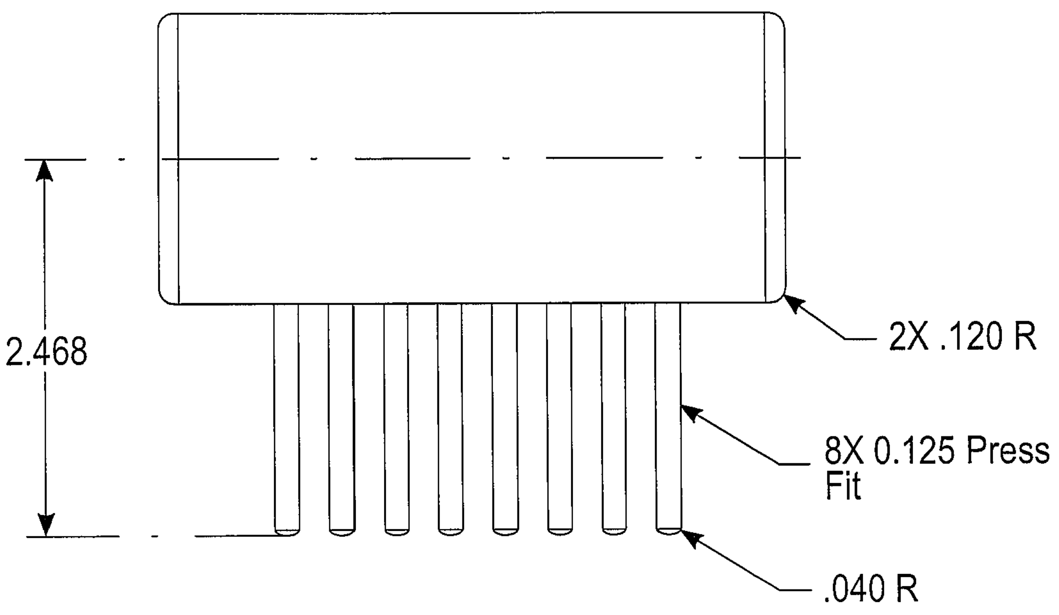
FIG. 6 is a schematic view of an 8-pin extractor.

Upon completion of a synthesis, a one- to 96-steel pin extractor is used to extract one to 96 frits through the bottom ends of the synthesis chambers. Preferably, an 8-pin extractor is used to extract simultaneously eight frits from eight chambers into eight collection vials. A detailed schematic view of an 8-pin extractor is shown FIG. 6. The steel pin extractor length is slightly longer than the synthesis chamber length.

Figure 7:
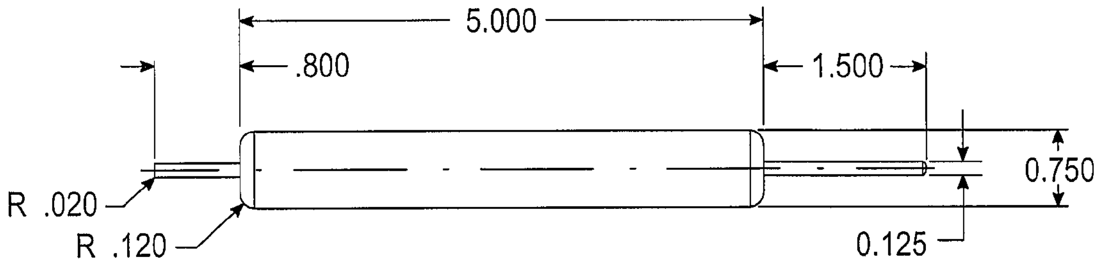
FIG. 7 is a schematic view of a combo 1-pin insertor/1-pin extractor.

A schematic view a combo 1-pin insertor/1-pin extractor is shown FIG. 7. A 1-pin insertor/1-pin extractor is used to insert or extract a single frit in/from a synthesis column or a synthesis chamber.

Pushing the frits through the narrower bottom end of the synthesis chambers or the synthesis columns does not damage the frits or the synthesis chambers or the synthesis columns. Therefore, the synthesis plates and synthesis columns are advantageously reused, contrarily to currently available consumable DNA synthesis columns. Another advantage is that the frits once extracted into collection vials or a 96-well collection plate are easily manipulated for post synthesis treatments.

C. Methods Describing the Use of the Synthesis Frits

To illustrate the use of the frits in the synthesis of nucleic acids, frits functionalized with a catechol-based universal linker have been prepared from aminopropylCPG frits 2. Catechol-based universal linkers have been described in U.S. Pat. No. 6,590,092. They are used irrespective to the first nucleotide of the said nucleic acids to be synthesized onto the solid support and irrespective of the type of monomer reagent used during the synthesis.

Figure 9:
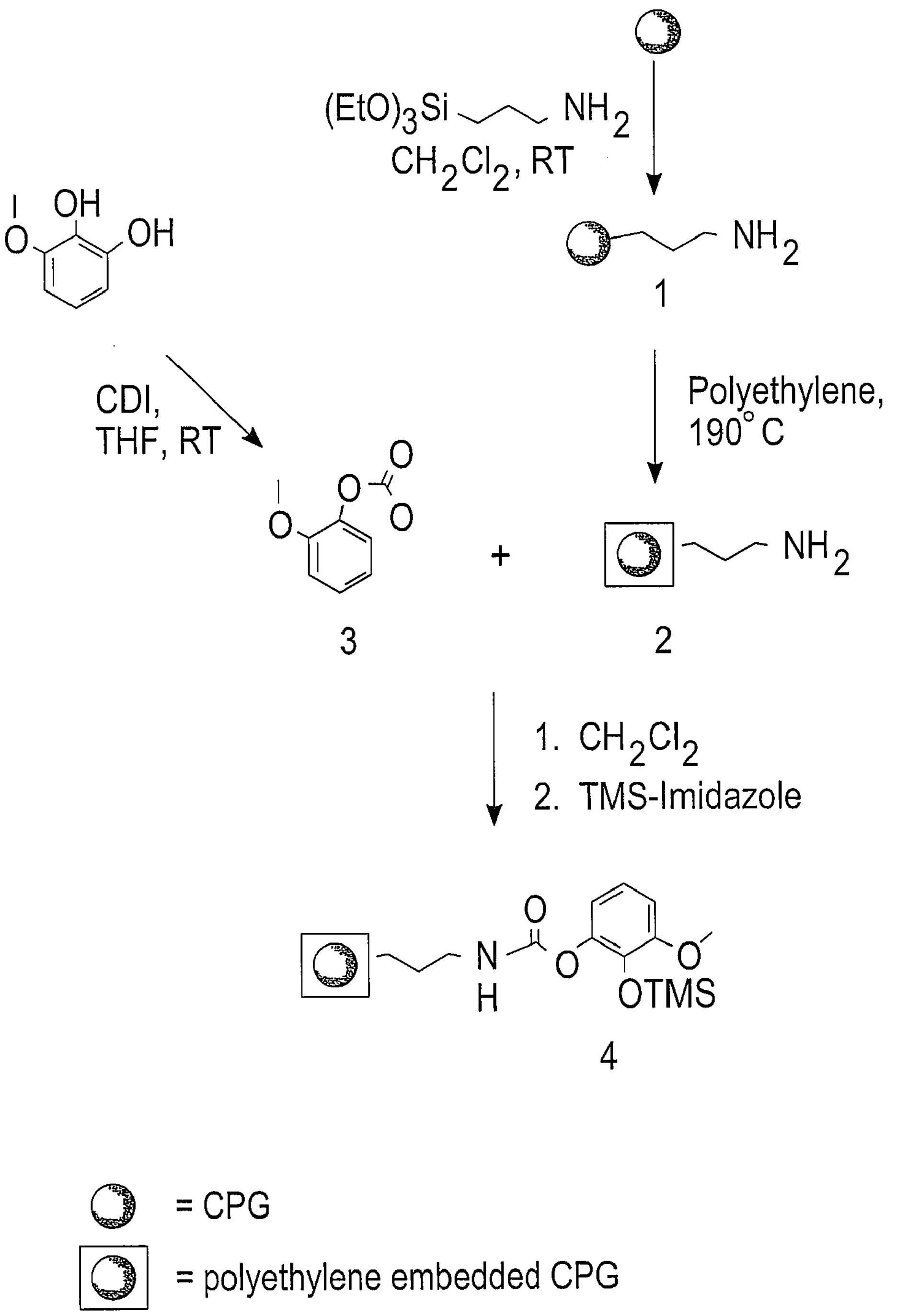
FIG. 9 describes the preparation of an embedded catechol-based universal support.

In a preferred embodiment, aminopropylCPG-frits 2 are reacted with excess carbonate 3 (FIG. 9). Excess carbonate is used in order to ensure a complete reaction of the amino moieties. Disappearance of the amino groups is monitored by ninhydrin test. The resulting carbamate bound catechol (regioisomeric mixture, one isomer shown) and the remaining CPG silanol groups are capped simultaneously with excess trimethylsilylimidazole yielding frits 4.

Frits 4 are employed to synthesize nucleic acids on automated synthesizers using synthesis columns or preferably using a 96-chamber synthesis plate. A schematic loading of a 96-chamber synthesis plate with an 8-pin insertor is described in FIG. 8. The synthetic cycle begins with a catechol deprotection step carried out with 3% trichloroacetic acid in dichloromethane, i.e. the reagent commonly used in the 5'-detritylation step. The first nucleotide is then attached to the catechol bound support using conventional phosphoramidite chemistry under the same conditions and with the same monomer reagent as the condensation of the second nucleotide with the desired first nucleotide bonded to the support. The said first nucleotide corresponds to the first nucleotide in the sequence of the said nucleic acid. Chain elongation occurs by sequential reaction of 5'-protected nucleoside phosphoramidites with the 5'-hydroxyl-end of the oligonucleotide bound polymer. Oxidation ($I_2$/pyridine/acetonitrile/$H_2O$), capping ($Ac_2O$) and detritylation (3% trichloroacetic acid in dichloromethane) steps are carried out as usual.

After the reagents are delivered into the synthesis chambers or the synthesis columns, a brief application of pressure is required to drive the reagents into the frits. Indeed, at ambient pressure, a wetting of a frit is sufficient to prevent entry of chemical reagents. This allows an efficient pre-mixing of the chemical reagents such as activator and 3'-phosphoramidite (or the synthesis columns) prior to their entry into the frit. The reagents stay inside the frit as long as needed and are flushed when a full draining surpressure is applied. To deliver the reagents into the frits or drain the reagents, an optimal pressure of 2.5 to 4.0 PSI at the chamber pressure is recommended. Delivery of the reagents into the frits requires a short pulse of pressure (one second for acetonitrile and dichloromethane solutions or two seconds for tetrahydrofuran solutions) while draining requires applying a surpressure for a longer time, at least 8 s and preferably 15 s.

Figure 8:
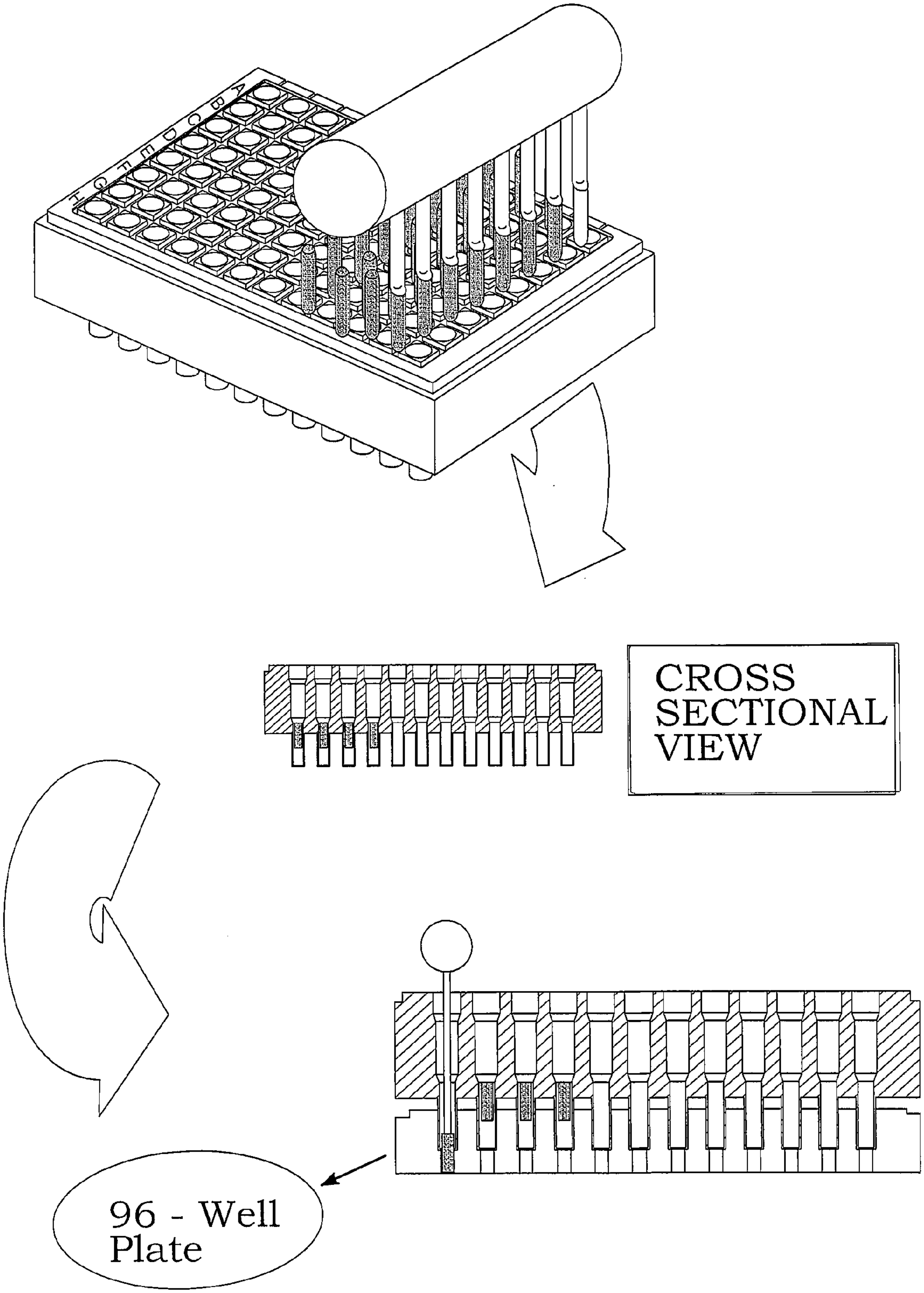
FIG. 8 is a schematic view of loading and extracting fits from a 96-chamber synthesis plate with an 8-pin insertor and an 8-pin extractor.

Upon completion of a nucleic acid synthesis, a frit extractor is used to push down the oligonucleotide-bound frits without damaging them into vials or into a collecting 96-well plate (see FIG. 8). The post-synthesis cleavage of the oligonucleotide-bound CPG and deprotection steps are carried out simultaneously by heating the frits with 33% ammonium hydroxide (6 h at 80° C.), 40% aq. methylamine or aq. ammonia-methylamine (1:1, v/v) (4 h at 80° C.) to yield 3'-hydroxyoligonucleotides free of any residual terminal phosphate group. After discarding the frits, the basic solutions containing the oligonucleotides are evaporated.

The following examples illustrate the invention without limiting it:

Example 1

Preparation of 200 nmol Catechol-Based Frit 4

A mixture of high-density polyethylene (66 g) and aminopropylCPG 1 (44 g, 10 μmol/g, 1000-angstrom pore size, and particle size 75/200 microns) is prepared. The mixture is poured onto an aluminum plate drilled with 1100 cylindrical wells. The well dimensions are diameter/length 3.90 mm/9.0 mm, respectively. The plate is heated at 190° C. for 15 min and cooled before releasing the frits 2. Excess carbonate 3 is added to a thousand frits suspended in dichloromethane under inert atmosphere at room temperature. After gently stirring for 48 hours, the frits are filtrated and washed successively with acetone and dichloromethane. The frits are resuspended in dichloromethane and trimethylsilylimidazole (0.80 mL) is added. After stirring for 2 hours, frits 4 are filtrated, washed with methanol and dichloromethane, and dried under vacuum.

Example 2

High Throughput Synthesis of 72 Oligonucleotides

Seventy-two frits 4 (200 nmol loading capacity) are inserted into 72 chambers of a 96-chamber synthesis plate of the invention using an 8-pin insertor. All 24 unused chambers of the synthesis plate are sealed with duct tape. Oligonucleotides having three different lengths (25-mers, 50-mers, and 75-mers) are synthesized on a high throughput synthesizer (BLP-192 from Biolytic Lab Performance, Ca) using conventional phosphoramidite chemistry that is in current use and will thus be known to those skilled in the art.

The following protocol is developed for a synthesizer using positive pressure for reagent delivery and draining. The gas pressure to drive the reagents into the frits and to drain the reagents from the frits is manually set at 2.5 PSI.

| Line | Description | Time(sec) | Volume(μl) | Explanation |
|---|---|---|---|---|
| 1 | TCA delivery | | 150 μl | Deblock step |
| 2 | Drain | 5 sec | | Pressure for draining |
| 3 | TCA delivery | | 150 μl | Deblock step |
| 4 | Push | 1 sec | | Pressure to get the reagents into the frit |
| 5 | Hold | 5 sec | | Reaction time |
| 6 | Drain | 15 sec | | Pressure for draining |
| 7 | ACN delivery | | 350 μl | ACN delivery |
| 8 | Drain | 25 sec | | Pressure for draining |
| 9 | Coupling | | | Amidite and ETT deliveries |
| 10 | Push | 1 sec | | Pressure to get the reagent into the frit |
| 11 | Hold | 40 sec | | Reaction time |
| 12 | Drain | 5 sec | | Pressure for draining |
| 13 | Capping | | | CAP A & B deliveries |
| 14 | Push | 2 sec | | Pressure to get the reagents into the frit |
| 15 | Hold | 10 sec | | Reaction time |
| 16 | Drain | 8 sec | | Pressure for draining |
| 17 | Oxidation | | | Iodine Delivery |
| 18 | Push | 2 sec | | Pressure to get the reagents into the frit |
| 19 | Hold | 10 sec | | Reaction time |
| 20 | Drain | 15 sec | | Pressure for draining |
| 21 | ACN delivery | | 350 μl | ACN delivery |
| 22 | Drain | 25 sec | | Pressure for draining |
| 23 | Loop | | | |

The 200 nmol frit has a dead volume around 60 μl. To get the best reaction yields with this frit, the total volume of reagents delivered for each step of the synthesis must be around 70-80 μl. To ensure a complete DMT removal, the delivery of 2×150 μl of 3% TCA in dichloromethane is recommended. Instead of using Tetrazol as activator, dicyanoimidazole (DCI) or ethyl thiotetrazol (ETT) is recommended for an optimal coupling efficiency. Upon completing the syntheses, the resulting oligonucleotide bound frits are pushed into vials using a frit extractor. Ammonium hydroxide is added and the vials are sealed and heated at 65° C. overnight. All the oligonucleotides obtained were of good to high purity as shown by HPLC of their crude and of correct sequences as inferred by mass spectrometry. The quality and consistency of all three-length nucleic acids were excellent.

Although the invention has been described in detail for the purpose of illustration, it is understood that such detail is solely for that purpose and variations can be made therein by those skilled in the art without departing from the spirit and scope of the invention which is defined by the following claims.

What we claim is:

1. A method of manufacturing cylindrical polyalkylene embedded silane-modified-CPG devices, comprising mixing an aqueous-free polyalkylene with a silane-modified CPG; filling cylindrical wells of an aluminum plate with said mixture; heating said plate at 180° C. to 220° C. for a predetermined schedule; and upon cooling, releasing from said plate said embedded devices.

2. The method according to claim 1, in which the said polyalkylene is selected from the group consisting of ultra-high molecular weight polyethylene, high density polyethylene, low density polyethylene, polypropylene, and mixtures thereof.

3. The method according to claim 1, in which the quantity of the said polyalkylene is preferably from 50 to 70% by weight, based on the total weight of the resin mixture.

4. The method according to claim 1, in which silane-modified-CPG are controlled porous glass beads which have been modified with aminoalkyltrialkoxysilane, [alkylamino]alkyl (trialkoxy) silane or mercaptoalkyl (trialkoxy) silane and mixtures thereof.

5. The method according to claim 4, wherein alkyl is selected from the group consisting of methyl, ethyl and propyl and wherein alkoxy is selected from the group consisting of methoxy, ethoxy and propoxy.

6. The method according to claim 1, wherein the said embedded devices contain less than ten micromoles of reactive amino or mercapto moieties.

7. The method according to claim 1, wherein the said aluminum plate is drilled with 50 to 5000 cylindrical wells.

8. The method according to claim 1 wherein each of said released embedded devices is a cylindrically shaped plug comprising said polyalkylene and silane-modified CPG mixture, whereby said cylindrical wells of said aluminum plate act as a mold for said released embedded devices.

* * * * *